(12) United States Patent
Takikawa et al.

(10) Patent No.: US 10,797,523 B2
(45) Date of Patent: Oct. 6, 2020

(54) NON-CONTACT POWER SUPPLY DEVICE

(71) Applicant: FUJI CORPORATION, Chiryu-shi (JP)

(72) Inventors: Shinji Takikawa, Nagoya (JP); Takeshi Nomura, Chiryu (JP); Masayuki Oki, Kosai (JP)

(73) Assignee: FUJI CORPORATION, Chiryu-shi (JP)

( * ) Notice: Subject to any disclaimer, the term of this patent is extended or adjusted under 35 U.S.C. 154(b) by 174 days.

(21) Appl. No.: 16/076,535

(22) PCT Filed: Feb. 17, 2016

(86) PCT No.: PCT/JP2016/054585
§ 371 (c)(1),
(2) Date: Aug. 8, 2018

(87) PCT Pub. No.: WO2017/141378
PCT Pub. Date: Aug. 24, 2017

(65) Prior Publication Data
US 2019/0044387 A1 Feb. 7, 2019

(51) Int. Cl.
*H02J 50/12* (2016.01)
*H02J 50/00* (2016.01)
(Continued)

(52) U.S. Cl.
CPC .............. *H02J 50/12* (2016.02); *H01F 38/14* (2013.01); *H02J 50/00* (2016.02); *H02J 50/40* (2016.02); *H02J 50/90* (2016.02)

(58) Field of Classification Search
None
See application file for complete search history.

(56) References Cited

U.S. PATENT DOCUMENTS

| 9,948,143 | B2* | 4/2018 | Abe | H02J 7/0042 |
| 2011/0018360 | A1* | 1/2011 | Baarman | H02J 50/12 307/104 |

(Continued)

FOREIGN PATENT DOCUMENTS

| EP | 2 328 254 A2 | 6/2011 |
| JP | 5-344603 A | 12/1993 |

(Continued)

OTHER PUBLICATIONS

Extended European Search Report dated Sep. 17, 2019, in Patent Application No. 16890520.6, 8 pages.
(Continued)

*Primary Examiner* — Jared Fureman
*Assistant Examiner* — Emmanuel Dominique
(74) *Attorney, Agent, or Firm* — Oblon, McClelland, Maier & Neustadt, L.L.P.

(57) ABSTRACT

A non-contact power supply device of the present invention includes a power supply element provided in a power supply unit, an AC power supply circuit for supplying AC power to the power supply element, a power receiving element provided in the power receiving, a power receiving circuit for outputting a received voltage, obtained by converting AC power received by the power receiving element, to an electric load, a resonance element connected to at least one of the power supply element and the power receiving element to form a resonance circuit; a power supply substrate configured to include the AC power supply circuit, a power receiving substrate configured to include the power receiving circuit, and a resonant substrate configured to include the resonant element. The non-contact power supply device having a versatile substrate configuration can be provided for multiple types of power supply elements and power receiving elements having different characteristics.

7 Claims, 3 Drawing Sheets

(51) Int. Cl.
*H02J 50/90* (2016.01)
*H02J 50/40* (2016.01)
*H01F 38/14* (2006.01)

(56) References Cited

U.S. PATENT DOCUMENTS

| | | | |
|---|---|---|---|
| 2011/0043050 A1* | 2/2011 | Yabe | H04B 5/0087 |
| | | | 307/104 |
| 2011/0127845 A1 | 6/2011 | Walley et al. | |
| 2012/0293279 A1* | 11/2012 | Gong | H01P 3/121 |
| | | | 333/202 |
| 2013/0187477 A1* | 7/2013 | Nagai | H01P 7/08 |
| | | | 307/104 |
| 2015/0244175 A1* | 8/2015 | Abe | H02J 7/0042 |
| | | | 307/104 |
| 2015/0249366 A1 | 9/2015 | Takikawa et al. | |
| 2016/0365635 A1* | 12/2016 | Jang | H04B 5/0031 |

FOREIGN PATENT DOCUMENTS

| | | | | |
|---|---|---|---|---|
| JP | 10-51982 A | 2/1998 | | |
| JP | 2010-75021 A | 4/2010 | | |
| JP | 2012-161110 A | 8/2012 | | |
| JP | 2014-143843 A | 8/2014 | | |
| JP | 2016063683 | * | 4/2016 | ............ H02J 50/00 |
| WO | WO 2014/049750 A1 | 4/2014 | | |
| WO | 2 903 131 A1 | 8/2015 | | |

OTHER PUBLICATIONS

International Search Report dated Apr. 26, 2016 in PCT/JP2016/054585 filed Feb. 17, 2016.

* cited by examiner

[Fig. 1]
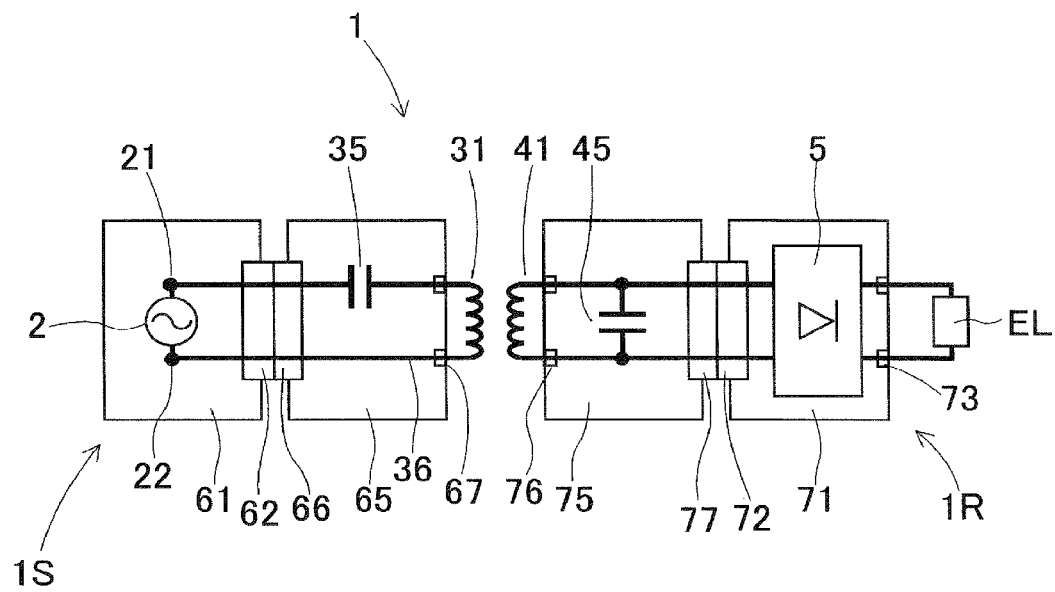
[Fig. 2]
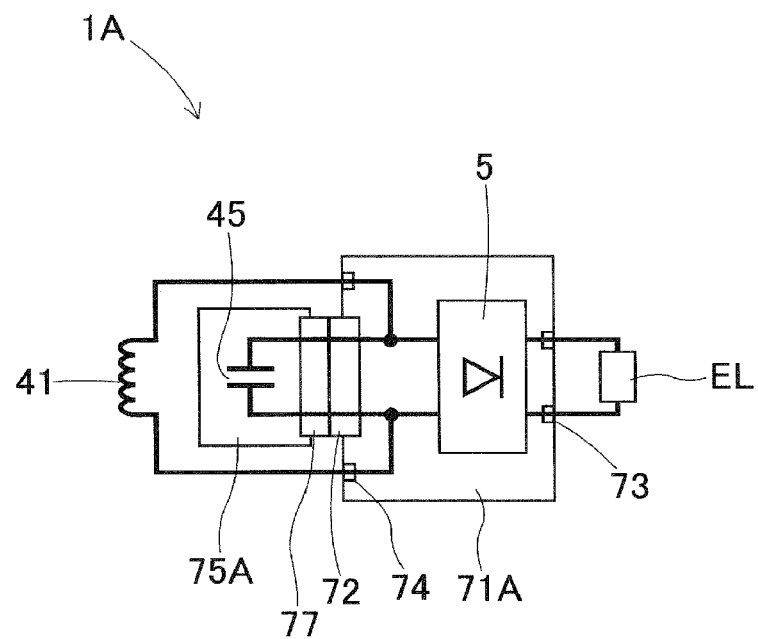

[Fig. 3]
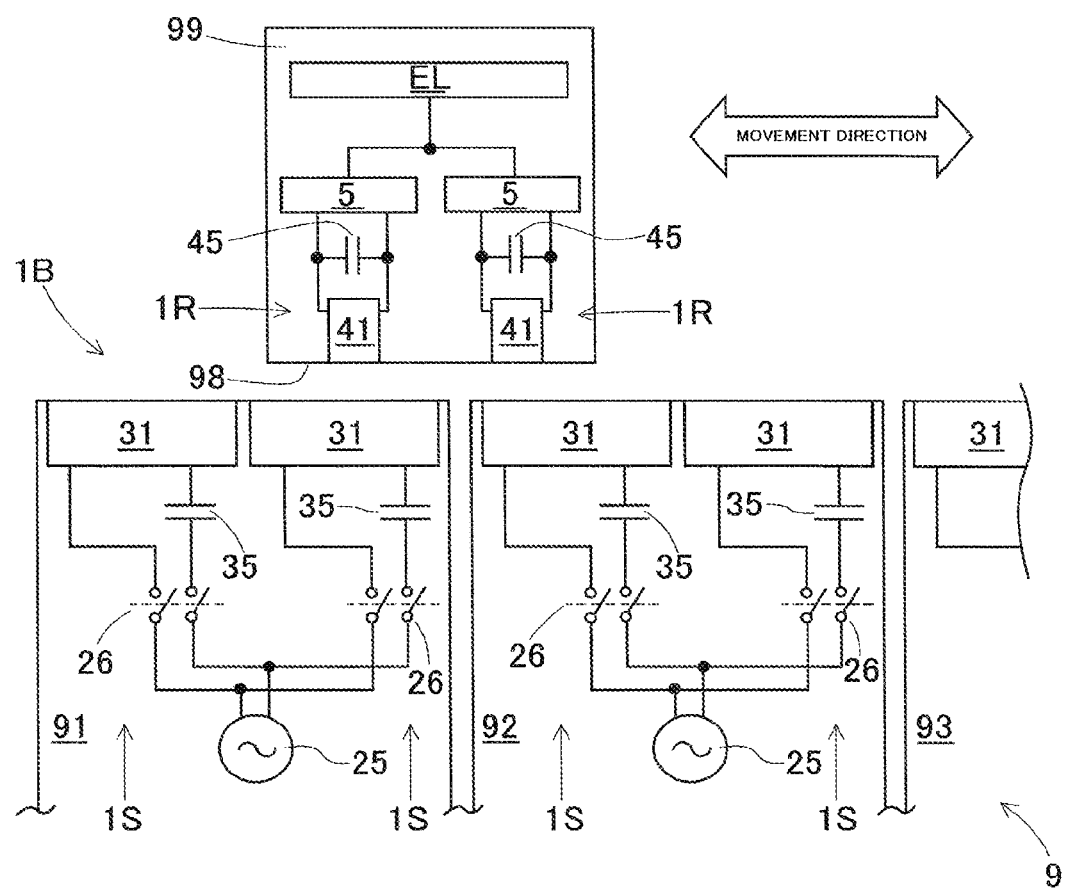

[Fig. 4]
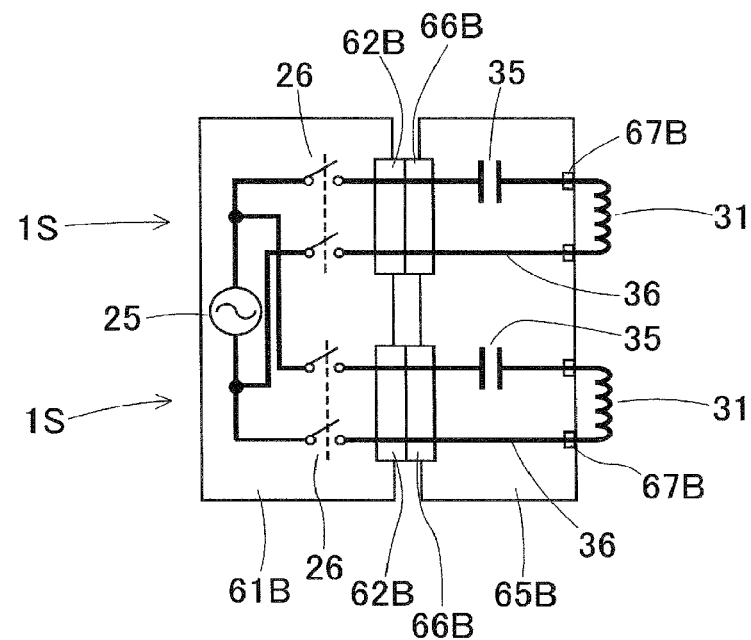
[Fig. 5]
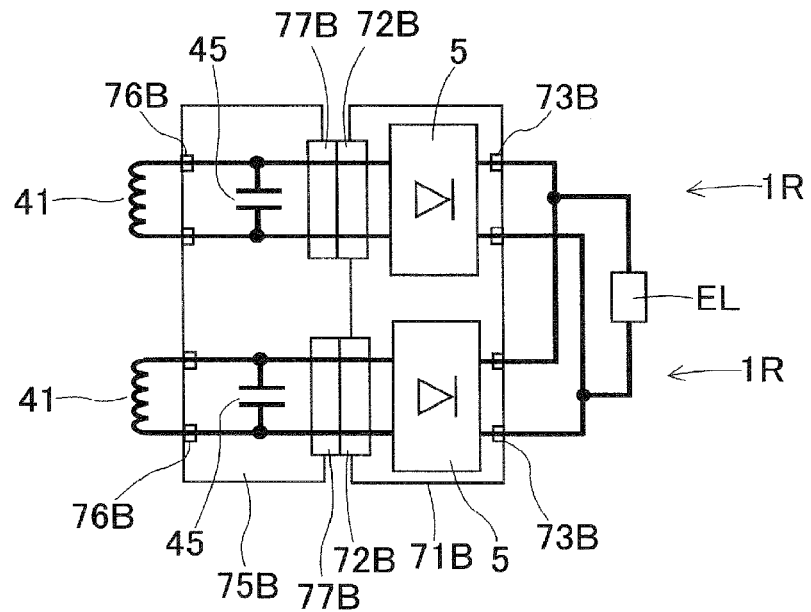

NON-CONTACT POWER SUPPLY DEVICE

TECHNICAL FIELD

The present application relates to a non-contact power supply device for supplying power in a non-contact manner from a power supply unit to a power receiving unit.

BACKGROUND ART

Substrate production apparatuses for producing a substrate, on which a large number of components are mounted, include solder printing apparatuses, electronic component mounting apparatuses, reflow apparatuses, substrate inspection apparatuses, and the like. It is widely known to connect these devices to configure a substrate production line. Further, in many cases, a substrate production line is configured by lining up modularized substrate production apparatuses of the same size. Modularized substrate production apparatuses facilitate carrying out replacements when rearranging or extending the length of the line, thus enabling implementation of flexible substrate production lines.

In recent years, consideration has been put into advancing labor saving and automation by conveying equipment and parts, those used in each substrate production machine of the substrate production line, with a moving body moving along the substrate production line. Further, a non-contact power supply device has been considered as a means for supplying power to the moving body. Applications of non-contact power supply devices are not limited to the substrate production lines but are applied to a wide range of fields, such as assembly lines and processing lines for producing other products, and supplying power in the operation of electric vehicles. In such non-contact power supply devices, an electromagnetic coupling method in which a coil is used for both a power supply element and a power receiving element is frequently used. Patent Documents 1 and 2 are disclosed as technical examples related to an electromagnetic coupling type non-contact power supply device.

The non-contact power supply device of Patent Document 1 includes a pickup unit inductively coupled to a power supply line. Through the power supply line, high-frequency current flows, and the power is supplied to a load by an induced electromotive force induced in the pickup unit. The pickup unit includes a core, a coil, and a resonance circuit. The resonance circuit includes a motherboard on which a conductor pattern to be connected to the coil is configured, a plurality of expansion cards on which one or more capacitors are mounted, and multiple connectors for detachably connecting each expansion card to the motherboard. Accordingly, the capacitance value of the capacitor, constituting the resonance circuit together with the coil, can be adjusted, thereby simplifying the operation of adjusting the resonance circuit. In other words, in comparison to a conventional resonance circuit constituted by a single board, by dividing the resonance circuit into a motherboard and expansion cards, the capacitance value of the capacitor can be adjusted simply by attaching/detaching the expansion cards.

Patent Document 2 discloses a power supply module of a non-contact power supply device that excites a primary coil, generates secondary power in a secondary coil of an adjacent device by electromagnetic induction, and supplies the secondary power to a load of the adjacent device. The power supply module includes a plurality of coil units, each having a primary coil, and a printed wiring board on which the plurality of coil units are arranged and connected to terminals in a drivable manner. Further, a mode in which a resonant capacitor is connected to each of the primary coils is also disclosed. In this way, the power supply module has a high degree of freedom in design, can supply power in a non-contact manner in various forms, and can be manufactured readily in a short time.

PRIOR ART

Patent Literature

Patent Document 1: Japanese Patent Application Laid-Open No. 2010-75021
Patent Document 2: Japanese Patent Application Laid-Open No. 2012-161110

BRIEF SUMMARY

Technical Problem

In the technical example of Patent Document 1, even if the inductance of the coil varies, the resonant frequency of the resonance circuit can be kept constant by adjusting the capacitance value of the capacitors. Further, in the technical example of Patent Document 2, resonant capacitors are connected to the primary coils. The two technical examples described above are intended for multiple coils having substantially the same characteristics. However, in order to accommodate multiple types of coils having different characteristics, it is necessary to significantly change the capacitance value of the resonant capacitor respectively. In this case, a larger variation in the capacitance value needs to be considered, different from the adjustment for variation in the inductance.

For example, in a non-contact power supply device applied in a substrate production line, characteristics such as the shape and size of a power supply coil (i.e., a power supply element) and a power receiving coil (i.e., a power receiving element) are changed based on the size of each substrate production machine and the power supply capacity supplied to the moving body. Therefore, in order to secure a desired capacitance value (i.e., an element constant), various large and small resonant capacitors (i.e., resonant elements) are used.

Here, a related art constituted by a single substrate that includes a capacitor in an AC power supply circuit of a power supply unit may be considered. In the related art, a large resonant capacitor is required when a large capacitance value is desired, resulting in not having enough space to be mounted on a single substrate. Similarly, in the related art related to the power receiving circuit of the power receiving unit which includes a resonant capacitor with being constituted by a single substrate, there is not enough space for mounting a large resonant capacitor on the single substrate. As a result, it is necessary to design single substrates separately based on the characteristics of multiple types of coils, which turns out a poor versatility.

The present disclosure has been made in view of the problems in the above-mentioned background art, and it is an object of the present disclosure to provide a non-contact power supply device having a versatile substrate configuration that can accommodate multiple types of power supply elements and power receiving elements having different characteristics.

Solution to Problem

A non-contact power supply device according to the present disclosure for solving the above problems comprises: a power supply element provided in a power supply unit; an AC power supply circuit which supplies AC power to the power supply element, a power receiving element, being provided in a power receiving unit with facing to the power supply element, which is electrically coupled to the power supply element to receive AC power in a non-contact manner; a power receiving circuit which generate a received voltage by converting the AC power received by the power receiving element, and outputs the received voltage to an electric load, and a resonant element connected to at least one of the power supply element and the power receiving element to configure a resonance circuit. The non-contact power supply device further comprises: a power supply substrate configured to include at least a part of the AC power supply circuit, a power receiving substrate configured to include at least a part of the power receiving circuit, and a resonant substrate configured to include the resonant element, and when a remaining part of the AC power supply circuit or a remaining part of the power receiving circuit remains, the resonant substrate being configured to further include the remaining part of the AC power supply circuit or the remaining part of the power receiving circuit respectively, in which the power supply substrate, the power receiving substrate, and the resonant substrate are separated from one another.

In the non-contact power supply device of the present disclosure, the power supply substrate configured to include at least a part of the AC power supply circuit, the power receiving substrate configured to include at least a part of the power receiving circuit, and the resonant substrate including the resonant element are provided separately. Therefore, the same power supply substrate and the same power receiving substrate can accommodate multiple types of power supply elements and power receiving elements having different characteristics. Further, it is possible to accommodate multiple types of the power supply elements and the power receiving elements merely by changing the element constant of the resonant element on the resonant substrate, and a new design of the resonant substrate or the like may be avoided. This facilitates controls of the production, quality, and inventory of substrates, and also facilitates adaptations of the devices that are already delivered. Therefore, according to the present disclosure, it is possible to provide a non-contact power supply device having a versatile substrate configuration.

BRIEF DESCRIPTION OF DRAWINGS

FIG. 1 is a diagram schematically illustrating a circuit configuration and a substrate configuration of a non-contact power supply device according to a first embodiment.

FIG. 2 is a diagram schematically illustrating a substrate configuration on a power receiving unit side in a modification of the non-contact power supply device of the first embodiment.

FIG. 3 is a diagram schematically illustrating a configuration of the non-contact power supply device according to a second embodiment.

FIG. 4 is a diagram schematically illustrating a substrate configuration on the power supply unit side in the non-contact power supply device according to the second embodiment.

FIG. 5 is a diagram schematically illustrating a substrate configuration on the power receiving unit side in the non-contact power supply device according to the second embodiment.

DESCRIPTION OF EMBODIMENTS (1. Circuit Configuration of a Non-Contact Power Supply Device 1 of a First Embodiment)

First, a circuit configuration of a non-contact power supply device 1 according to a first embodiment of the present disclosure will be described with reference to FIG. 1. FIG. 1 is a diagram schematically illustrating a circuit configuration and a substrate configuration of the non-contact power supply device 1 according to the first embodiment. The bold line in FIG. 1 shows a non-contact power supply circuit. The non-contact power supply device 1 of the first embodiment includes a power supply unit 1S and a power receiving unit 1R. The power supply unit 1S is disposed at a fixed position. The position of the power receiving unit 1R can be changed with respect to the power supply unit 1S. As shown in the figure, when the power receiving unit 1R is disposed at a position opposite to the power supply unit 1S, the non-contact power supply device 1 supplies power in a non-contact manner by an electromagnetic coupling method.

The power supply unit 1S includes an AC power supply circuit 2, a power supply side resonant capacitor 35, and a power supply coil 31. More specifically, a high-voltage output terminal 21 of the AC power supply circuit 2 is connected to one end of the power supply side resonant capacitor 35. The other end of the power supply side resonant capacitor 35 is connected to one end of the power supply coil 31. The other end of the power supply coil 31 is connected to a low-voltage output terminal 22 of the AC power supply circuit 2. The above-mentioned connection constitutes a looped power supply circuit.

The AC power supply circuit 2 supplies AC power to the power supply coil 31. The AC power supply circuit 2 can be configured by using, for example, a DC power supply unit that supplies DC voltage and a known bridge circuit that converts the DC voltage into AC voltage. An order of several 10 kHz to several 100 kHz is an example of a frequency f0 of the AC power supply circuit 2, but the frequency f0 is not limited to this.

The power supply side resonant capacitor 35 and the power supply coil 31 constitute a power supply side resonance circuit. The power supply side resonance circuit is a series resonance circuit as viewed from the AC power supply circuit 2. The power supply side resonant frequency fs of the power supply side resonance circuit is obtained by the following equation 1. π is the circumferential ratio, LS is the inductance of the power supply coil 31, and CS is the capacitance value of the supply side resonant capacitor 35.

$$fs = \tfrac{1}{2}\pi(LS \cdot CS)0.5 \qquad \text{Equation 1}$$

The power receiving unit 1R includes a power receiving coil 41, a power receiving side resonant capacitor 45, and a power receiving circuit 5. One end of the power receiving coil 41 is connected to one end of the power receiving side resonant capacitor 45 and a first input terminal of the power receiving circuit 5. The other end of the power receiving coil 41 is connected to the other end of the power receiving side resonant capacitor 45 and a second input terminal of the power receiving circuit 5. A first output terminal and a second output terminal of the power receiving circuit 5 are connected to the electrical load EL. The above-mentioned connections constitute the power receiving circuit 5.

When the power receiving coil 41 faces the power supply coil 31, the power receiving coil 41 is electromagnetically coupled to receive AC power in a non-contact manner. The power receiving coil 41 and the power receiving side resonant capacitor 45 constitute a power receiving side resonance circuit. The power receiving side resonance circuit is a parallel resonance circuit as viewed from the electric load EL side. The power receiving side resonant frequency fr of the power receiving side resonance circuit is obtained by Equation 2 which follows. π is the circumferential ratio, LR is the inductance of the power receiving coil 41, and CR is the capacitance value of the power receiving side resonant capacitor 45.

$$fr = 1/2\pi(LR \cdot CR) \qquad \text{Equation 2}$$

The power receiving circuit 5 converts AC power received by the power receiving coil 41, generates a received voltage, and outputs the received voltage to the electric load EL. A full-wave rectification circuit is an example of a power receiving circuit 5, but the present disclosure is not limited to this. The full-wave rectification circuit can be constituted by, for example, abridge circuit that includes four rectifying diodes and a smoothing capacitor.

The electric load EL performs work in the power receiving unit 1R, and its type, power consumption, and the like are not limited. The electric load EL may include an electrical drive source for moving the power receiving unit 1R. Further, DC/DC converters or the like for adjusting the levels of received voltages and outputting them to the electric load EL can also be considered included in a part of the electric load EL.

(2. Substrate Configuration of the Non-Contact Power Supply Device 1 of a First Embodiment)

The substrate configuration of the non-contact power supply device 1 according to the first embodiment will be described. As shown in FIG. 1, the power supply unit 1S includes a power supply substrate 61 and a power supply side resonant substrate 65 which are separated apart from each other. The power supply substrate 61 is configured by mounting circuit components that constitute the AC power supply circuit 2. The power supply substrate 61 has a connector 62 for connecting the high-voltage output terminal 21 to the low-voltage output terminal 22 of the AC power supply circuit 2.

The power supply side resonant substrate 65 is configured by mounting the power supply side resonant capacitor 35 and the conductor 36. The conductor 36 is a part for connecting the other end of the power supply coil 31 to the low-voltage output terminal 22 of the AC power supply circuit 2. The power supply side resonant substrate 65 has a connector 66 and a pair of terminals 67 for connecting the power supply side resonant capacitor 35 to the conductor 36. The connector 66 is fitted and connected to the connector 62 of the power supply substrate 61. The pair of terminals 67 are connected to the power supply coil 31. It is reminded that a part of the circuit components forming the AC power supply circuit 2 may be mounted on the power supply substrate 61, and the remaining part may be mounted on the power supply side resonant substrate 65.

On the other side, the power receiving unit 1R includes a power receiving side resonant substrate 75 and a power receiving substrate 71 which are separated apart from each other. The power receiving side resonant substrate 75 is configured by mounting the power receiving side resonant capacitor 45. The power receiving side resonant substrate 75 has a pair of terminals 76 and a connector 77 to enable connection to the power receiving side resonant capacitor 45. The terminal pair 76 is connected to the power receiving coil 41.

The power receiving substrate 71 is configured by mounting circuit components that constitute the power receiving circuit 5. The power receiving substrate 71 has a connector 72 and a pair of terminals 73 to enable connection to the power receiving circuit 5. The connector 72 is fitted and connected to the connector 77 of the power receiving side resonant substrate 75. The pair of terminals 73 are connected to the electric load EL. Note that a part of the circuit components forming the power receiving circuit 5 may be mounted on the power receiving substrate 71, and the remaining part may be mounted on the power receiving side resonant substrate 75.

Here, only one type of power supply substrate 61 is provided, and the frequency f0 of the AC power supply circuit 2 is set to a constant value. On the other hand, multiple types of power supply coils 31 and power receiving coils 41 having different characteristics are provided. For this reason, it is necessary to set the frequency to optimize the supply side resonance frequency fs with respect to the frequency f0 of the AC power supply circuit 2 regardless of the characteristics of the power supply coil 31 and the power receiving coil 41.

In the adjustment of frequency, the element constant of the power supply side resonant capacitor 35, that is, the capacitance value CS, is changed according to the element constant, that is, the inductance value LS, of the multiple types of power supply coils 31. As can be seen from Equation 1, the supply side resonance frequency fs can be kept constant by changing the capacitance value CS to a small value when the inductance value LS is large, or by changing the capacitance value CS to a large value when the inductance value LS is small.

Similarly, it is necessary to set the frequency to optimize the power receiving side resonance frequency fr. In the frequency adjustment, the capacitance value CR of the power receiving side resonant capacitor 45 is changed according to the inductance value LR of the multiple-type power receiving coils 41. As can be seen from Equation 2, the power receiving side resonance frequency fr can be kept constant by changing the capacitance value CR to a small value when the inductance value LR is large, or by changing the capacitance value CR to a large value when the inductance value LR is small. In this case, since the received voltage does not change significantly, only one type of power receiving substrate 71 needs to be provided.

The power supply side resonant capacitor 35 and the power receiving side resonant capacitor 45 need not be a single component. That is, by appropriately combining and using a plurality of capacitor components, desired capacitance values CS and CR can be obtained.

As described above, in the first embodiment, the power supply substrate 61 and the power receiving substrate 71 can be of one type. Multiple types of power supply side resonant substrates 65 and power receiving side resonant substrates 75, however, are provided. Multiple types of power supply side resonant substrates 65 and power receiving side resonant substrates 75 can accommodate each other by changing only the capacitance values CS and CR in accordance with multiple types of power supply coils 31 and power receiving coils 41. Therefore, a new design or the like of the substrates 65, 75 may be avoided.

On the other hand, in the prior art, each of the power supply unit 1S and the power receiving unit 1R is constituted by a single substrate. For this reason, it is necessary to design different single substrates corresponding to the multiple types of power supply coils 31 and power receiving coils 41 having different characteristics. In other words, the prior art lacks versatility.

(3. Aspects and Effects of the Non-Contact Power Supply Device 1 of the First Embodiment)

The non-contact power supply device 1 of the first embodiment is a non-contact power supply device comprising: a power supply element (i.e., a power supply coil 31) provided in a power supply unit 1S; the AC power supply circuit 2 for supplying AC power to the power supply element; a power receiving element (i.e., a power receiving coil 41) provided in the power receiving unit 1R and electrically coupled to face the power supply element to receive AC power in a non-contact manner; a power receiving circuit 5 for converting the AC power, received by the power receiving element to generate a received voltage, and outputting the received voltage to an electric load EL; a resonance element (i.e., a power supply side resonant capacitor 35, a power receiving side resonant capacitor 45) connected to at least one of the power supply element and the power receiving element to form a resonance circuit; wherein a power supply substrate 61, configured to include at least a part of the AC power supply circuit 2, a power receiving substrate 71, configured to include at least a part of the power receiving circuit 5, and a resonant substrate (i.e., a power supply side resonant substrate 65, a power receiving side resonant substrate 75), configured to include a resonant element along with a remaining part, in the case where a part of the AC power supply circuit 2 or the power receiving circuit 5 remains, are separated from each other.

In the non-contact power supply device 1 according to the first embodiment, a power supply substrate 61 including at least a part of the AC power supply circuit 2, a power receiving substrate 71 including at least a part of the power receiving circuit 5, and a resonant substrate (i.e., the power supply side resonant substrate 65 and the power receiving side resonant substrate 75) including a resonant element are separated from each other. Therefore, the same power supply substrate 61 and the same power receiving substrate 71 can accommodate multiple types of power supply elements (i.e., power supply coils 31) and power receiving elements (i.e., power receiving coils 41) having different characteristics. Further, it is possible to accommodate multiple types of power supply elements and power receiving elements only by changing the element constants (i.e., the capacitance values CS and CR) of the resonant elements (i.e., the power supply side resonant capacitor 35 and the power receiving side resonant capacitor 45) on the resonant substrate, which turns out new designs of the resonant substrates 65, 75 being avoided. This facilitates the controls of the production, quality, and inventory of substrates 61, 65, 71, 75, and also facilitates adaptations of the devices that are already delivered. As a result, it is possible to provide the non-contact power supply device 1 with a versatile substrate configuration.

Further, the resonant element is a power supply side resonant element (i.e., a power supply side resonant capacitor 35) connected to the power supply element (i.e., power supply coil 31) to form a power supply side resonance circuit, and the resonant substrate is a power supply side resonant substrate 65 configured to include the power supply side resonant element along with the remainder of the AC power supply circuit 2 when the remainder is present.

The resonant element is a power receiving side resonant element (i.e., a power receiving side resonant capacitor 45) connected to the power receiving element (i.e., the power receiving coil 41) to form a power receiving side resonance circuit, and the resonant substrate is a power receiving side resonant substrate 75 configured to include the power receiving side resonant element along with the remainder of the power receiving circuit 5 when the remainder is present.

As described above, it is also possible to implement the present disclosure with only one of the power supply unit 1S and the power receiving unit 1R.

Further, the element constant (i.e., capacitance values CS, CR) of the resonant element (i.e., the power supply side resonant capacitor 35 and the power receiving side resonant capacitor 45) is changed according to the element constant (i.e., inductance values LS, LR) of at least one of the power supply element (i.e., the power supply coil 31) and the power receiving element (i.e., the power receiving coil 41). According to this, even if any of the multiple types of power supply coils 31 and the power receiving coils 41 having different characteristics is used, a high power supply efficiency can be obtained by utilizing the resonance characteristics.

Further, the power supply element is a power supply coil 31, the power receiving element is a power receiving coil 41, and the resonant element is at least one of the power supply side resonant capacitor 35 connected to the power supply coil 31 and the power receiving side resonant capacitor 45 connected to the power receiving coil 41. According to this, the non-contact power supply device 1 of the electromagnetic coupling system can have a versatile substrate configuration.

(4. Modification of the Non-Contact Power Supply Device 1 of the First Embodiment)

Next, a modification of the first embodiment will be described. In the modified embodiment, the substrate configuration on the side of the power supply unit 1S is not changed, but the substrate configuration on the side of the power receiving unit 1A is changed. FIG. 2 is a diagram schematically illustrating a substrate configuration on a power receiving unit side 1A in a modification of the non-contact power supply device 1 of the first embodiment.

The power receiving unit 1A of the modified embodiment includes a power receiving side resonant substrate 75A and a power receiving substrate 71A. The power receiving side resonant substrate 75A is configured by mounting the power receiving side resonant capacitor 45. The power receiving side resonant substrate 75A has a connector 77 to enable connection to the power receiving side resonant capacitor 45.

The power receiving substrate 71A is configured by mounting circuit components that constitute the power receiving circuit 5. The power receiving substrate 71A has a connector 72 and a pair of terminals 73, 74 that connect to the power receiving circuit 5. The connector 72 is fitted and connected to the connector 77 of the power receiving side resonant substrate 75A. The first pair of terminals 73 is connected to the electric load EL. The second pair of terminals 74 is connected to the power receiving coil 41. Note that a part of the circuit components forming the power receiving circuit 5 may be mounted on the power receiving substrate 71A, and the remaining part may be mounted on the power receiving side resonant substrate 75A.

Effects of the modification of the first embodiment are the same as those in the first embodiment, and therefore description thereof is omitted.

(5. The Non-Contact Power Supply Device 1B According to the Second Embodiment)

Next, the non-contact power supply device 1B according to the second embodiment will be mainly described with respect to points that are different from the first embodiment. FIG. 3 is a diagram schematically illustrating a configuration of the non-contact power supply device 1B according to the second embodiment. The non-contact power supply device 1B of the second embodiment is applied to a substrate production line 9. As shown in the figure, the substrate production line 9 is configured by arranging a plurality of substrate production apparatuses 91-93 in a line. The left-right direction in FIG. 3 is a line-up direction of the substrate production apparatuses 91-93, and is also a movement direction of a moving body 99 described later.

Each of the substrate production apparatuses 91-93 is modularized, and the widths of the substrate production apparatuses in the line-up direction are equal to each other. The line order positions of the substrate production apparatus 91-93 can be changed and the substrate production apparatuses 91-93 can be replaced with other modularized substrate production apparatuses. The number of the substrate production apparatuses 91-93 to be arranged in a line is not limited, and it is also possible to accommodate an expansion via an increase in modules later. Electronic component mounting apparatuses are examples of substrate production apparatuses 91-93, but the present disclosure is not limited to this.

Guide rails (not shown) extending in the line-up direction are disposed in front of the substrate production apparatuses 91-93. A moving body 99 moves in the movement direction along the guide rail. The moving body 99 has a function of transporting equipment and parts used in each of the substrate production apparatuses 91-93 from a storage box (not shown) and returning the equipment and parts after use to the storage box.

In the non-contact power supply device 1B of the second embodiment, two power supply units 1S are provided on the front side of each of the substrate production apparatuses 91-93. As shown in FIG. 3, the two power supply units 1S share an AC power supply circuit 25. That is, each of the power supply coils 31 of the two power supply units 1S is connected in parallel to the AC power supply circuit 25 via a power supply switch 26. The two power supply coils 31 are individually turned on and off. On the other side, two power receiving units 1R are provided on a side surface 98 of the moving body 99 that faces the substrate production apparatuses 91-93. Through integration of the output sides of the power receiving circuits 5, the two power receiving units 1R supply power to a common electric load EL.

Here, the lengths of the plurality of power supply coils 31 and the two power receiving coils 41 in the movement direction and the separation distance between elements in the movement direction are set so that power is supplied in a non-contacting in a stable manner. That is, regardless of the position of the moving body 99, the power supply coil 31 and at least one power receiving coil 41 are always facing each other. A facing state is a state in which the entire length of the power receiving coil 41 in the movement direction facing the power supply coil 31 falls within the range of the power supply coil 31 length in the movement direction. The power receiving coil 41 in the facing state has enough power receiving capacity to drive the electric load EL alone.

A description will now be given to the substrate configuration of the non-contact power supply device 1B according to the second embodiment. FIG. 4 is a diagram schematically illustrating a substrate configuration on the side of the power supply unit 1S in the non-contact power supply device 1B according to the second embodiment. As shown in the figure, the two power supply units 1S share the power supply substrate 61B and the power supply side resonant substrate 65B, which are separated from each other. The power supply substrate 61B is configured by mounting circuit components that constitute the AC power supply circuit 25 and two power supply switches 26. The power supply substrate 61B has two sets of connectors 62B to enable connection to the AC power supply circuit 25.

The power supply side resonant substrate 65B is configured by mounting two sets of the power supply side resonant capacitor 35 and the conductor 36. The power supply side resonant substrate 65B has two pairs of terminals 67B that enable connection between the power supply side resonant capacitors 35 and the conductors 36. The two sets of connectors 66B are fitted and connected to the two sets of connectors 62B of the power supply substrate 61B in a one-to-one manner. The two pairs of terminals 67B are respectively connected to the power supply coil 31.

FIG. 5 is a diagram schematically illustrating a substrate configuration on the side of the power receiving unit 1R in the non-contact power supply device 1B according to the second embodiment. As shown in the figure, the two power receiving units 1R share the power receiving side resonant substrate 75B and the power receiving substrate 71B, which are separated from each other. The power receiving side resonant substrate 75B is configured by mounting two power receiving side resonant capacitors 45. The power receiving side resonant substrate 75B has two pairs of terminals 76B and two sets of connectors 77B to enable connection to the power receiving side resonant capacitors 45. The two pairs of terminals 76B are respectively connected to the power receiving coils 41.

The power receiving substrate 71B is configured by mounting circuit components that constitute two sets of power receiving circuits 5. The power receiving substrate 71B has two sets of connectors 72B and two pairs of terminals 73B to enable connection to the power receiving circuits 5. The two sets of connectors 72B are fitted and connected to the two sets of connectors 77B of the power receiving side resonant substrate 75B in a one-to-one manner. The two pairs of terminals 73B are connected in parallel to the electric load EL.

Also in the second embodiment, as in the first embodiment, the power supply substrate 61B and the power receiving substrate 71B can be of one type. However, multiple types of the power supply side resonant substrate 65B and multiple types of the power receiving side resonant substrate 75B may be provided. Multiple types of the power supply side resonant substrate 65B and the power receiving side resonant substrate 75B can accommodate multiple types of the power supply coil 31 and the power receiving coil 41 by changing only the capacitance values CS and CR. Therefore, a new design or the like of the substrates 65B, 75B may be avoided.

In the non-contact power supply device 1B of the second embodiment, at least one of either the power supply units 1S or the power receiving units 1R may be provided for multiple numbers, and the resonant substrate (i.e., the power supply side resonant substrate 65B or the power receiving side resonant substrate 75B) is configured to be shared by a plurality of the power supply units 1S or a plurality of the power receiving units 1R. The resonant substrate is also configured to include a plurality of resonant elements (i.e., the power supply side resonant capacitor 35 or the power receiving side resonant capacitor 45). Accordingly, the substrate configurations corresponding to the plurality of power supply coils 31 and the plurality of power receiving coils 41 can be shared, which is advantageous in reducing cost.

Further, an equivalent number (i.e., two) of the power supply units 1S are provided for each of the plurality of substrate production apparatuses 91-93 constituting the substrate production line 9, and the power receiving unit 1R is provided in the moving body 99 that moves in the direction in which the plurality of substrate production apparatuses 91-93 are lined up.

Accordingly, in all cases of changing the line order positions of the substrate production apparatuses 91-93, replacing the substrate production apparatuses 91-93 with other modularized substrate production apparatuses, and accommodating an expansion via an increase in modules, the non-contact power supply device 1B is ensured to be in a good power receiving state. Therefore, when the line configuration of the substrate production line 9 is changed or when a module is added, the setup replacement operation for the non-contact power supply device 1B is simplified.

Further, characteristics such as the shapes and dimensions of the power supply coil 31 and the power receiving coil 41 are changed in accordance with the size of the substrate production apparatuses 91-93 and the power supply capacity for supplying power to the moving body 99. In this case, the non-contact power supply device 1B can be configured by combining one type of power supply substrate 61B and power receiving substrate 71B with a selected power supply side resonant substrate 65B and power receiving side resonant substrate 75B. Therefore, according to the second embodiment, it is possible to provide the non-contact power supply device 1B with a versatile substrate configuration.

(6. Applications and Modifications of Embodiments)

It is noted that the power supply substrates 61, 61B, the power supply side resonant substrates 65, 65B, the power receiving substrates 71, 71B, and the power receiving side resonant substrates 75, 75B do not necessarily have to be in the shape of substrates. For example, instead of the power supply substrates 61, 61B, a box-shaped AC power supply device may be used. In this case, the power supply side resonant substrates 65, 65B are separated from the AC power supply device, and the same effects as those of the first and second embodiments are produced. Various other applications and modifications of the present disclosure are possible.

INDUSTRIAL APPLICABILITY

In addition to the substrate production line 9 described in the second embodiment, the non-contact power supply device of the present disclosure can be used in a wide range of fields such as assembly lines and processing lines for producing other products, and supplying power during running of an electric vehicle.

EXPLANATION OF REFERENCE NUMERALS 1, 1B: non-contact power supply device
1S: power supply unit 1R, 1A: power receiving unit
2: AC power supply circuit 25: AC power supply circuit 26: power switch
31: power supply coil 35: power supply side resonant capacitor
41: power receiving coil 45: power receiving side resonant capacitor
5: power receiving circuit
61, 61B: power supply substrates 65, 65B: power supply side resonant substrates
71, 71A, 71B: Power receiving substrates 75, 75A, 75B: Power receiving side resonant substrates
9: Substrate production line 91-93: Substrate production apparatuses 99: Moving body
EL: Electric load

The invention claimed is:

1. A non-contact power supply device comprising:
a power supply element provided in a power supply unit;
an AC power supply circuit which supplies AC power to the power supply element,
a power receiving element, being provided in a power receiving unit with facing to the power supply element, which is electrically coupled to the power supply element to receive AC power in a non-contact manner;
a power receiving circuit which generate a received voltage by converting the AC power received by the power receiving element, and outputs the received voltage to an electric load;
a resonant element connected to one of the power supply element and the power receiving element to configure a resonance circuit;
a power supply substrate configured to include a first part of the AC power supply circuit,
a power receiving substrate configured to include a first part of the power receiving circuit, and
a resonant substrate configured to include the resonant element,
a connector configured to connect one of the power supply substrate and the power receiving substrate, and
a pair of terminals configured to connect one of the power supply element and the power receiving element to the resonant substrate,
the power supply substrate, the power receiving substrate, and the resonant substrate are separated from one another, and
the non-contact power supply device is configured to accommodate multiple types of the power supply element and the power receiving element by changing an element constant of the resonant element via the connector and the pair of terminals.

2. The non-contact power supply device according to claim 1, wherein
the resonant element is a power supply side resonant element connected to the power supply element to form a power supply side resonance circuit, and
the resonant substrate is a power supply side resonant substrate including the power supply side resonant element, and the power supply side resonant substrate includes a second part of the AC power supply circuit.

3. The non-contact power supply device according to claim 2, wherein
the resonant element is a power receiving side resonant element connected to the power receiving element to configure a power receiving side resonance circuit, and
the resonant substrate is a power receiving side resonant substrate including the power receiving side resonant element and the power receiving side resonant substrate includes a second part of the power receiving circuit.

4. The non-contact power supply device according to claim 1, wherein
at least one of the power supply unit and the power receiving unit comprises a plurality of the power supply units or a plurality of the power receiving units respectively, and
the resonant substrate is shared by the plurality of the power supply units or the plurality of the power receiving units, and is configured to include a plurality of the resonant elements.

5. The non-contact power supply device according to claim 1, wherein
the element constant of the resonant element is changed in accordance with an element constant of at least one of the power supply element and the power receiving element.

6. The non-contact power supply device according to claim 1, wherein
the power supply element is a power supply coil, and the power receiving element is a power receiving coil, and
the resonant element is one of a power supply side resonant capacitor connected to the power supply coil and a power receiving side resonant capacitor connected to the power receiving coil.

7. The non-contact power supply device according to claim 1, wherein
two of the power supply units are provided to on the front side of each of a plurality of substrate production apparatuses constituting a substrate production line, and
two of the power receiving units are provided on a side surface of a moving body that moves in a direction in which the plurality of substrate production apparatuses are lined up and faces the substrate production apparatuses so that regardless of the position of the moving body, the power supply unit and at least one power receiving unit are always facing each other.

* * * * *